United States Patent
Sandor et al.

(10) Patent No.: US 8,554,542 B2
(45) Date of Patent: Oct. 8, 2013

(54) TEXTUAL ENTAILMENT METHOD FOR LINKING TEXT OF AN ABSTRACT TO TEXT IN THE MAIN BODY OF A DOCUMENT

(75) Inventors: Ágnès Sandor, Meylan (FR); Guillaume Jacquet, Biviers (FR)

(73) Assignee: Xerox Corporation, Norwalk, CT (US)

( * ) Notice: Subject to any disclaimer, the term of this patent is extended or adjusted under 35 U.S.C. 154(b) by 349 days.

(21) Appl. No.: 12/774,157

(22) Filed: May 5, 2010

(65) Prior Publication Data
US 2011/0276322 A1   Nov. 10, 2011

(51) Int. Cl.
G06F 17/27   (2006.01)

(52) U.S. Cl.
USPC ............. 704/9; 704/1; 704/2; 704/3; 704/4; 704/5; 704/6; 704/7; 704/8; 704/10

(58) Field of Classification Search
USPC ........................................... 704/1–10
See application file for complete search history.

(56) References Cited

U.S. PATENT DOCUMENTS

| | | | |
|---|---|---|---|
| 5,297,249 A * | 3/1994 | Bernstein et al. ............. | 715/854 |
| 5,778,397 A * | 7/1998 | Kupiec et al. ................ | 715/243 |
| 6,282,538 B1 * | 8/2001 | Woods ................................ | 1/1 |
| 6,990,634 B2 * | 1/2006 | Conroy et al. ............... | 715/227 |
| 7,003,719 B1 * | 2/2006 | Rosenoff et al. ............. | 715/205 |
| 7,031,970 B2 * | 4/2006 | Blitzer .................................. | 1/1 |
| 7,058,567 B2 * | 6/2006 | Ait-Mokhtar et al. ........... | 704/9 |
| 7,058,883 B1 * | 6/2006 | Oda ............................. | 715/206 |
| 7,346,494 B2 * | 3/2008 | Ando et al. .................... | 704/9 |
| 7,398,196 B1 * | 7/2008 | Liu et al. ........................ | 704/1 |
| 7,412,385 B2 * | 8/2008 | Brockett et al. ............. | 704/245 |
| 7,483,828 B2 * | 1/2009 | Abir ................................ | 704/8 |
| 7,584,092 B2 * | 9/2009 | Brockett et al. ................ | 704/9 |
| 7,606,794 B2 * | 10/2009 | Carson et al. ...................... | 1/1 |
| 7,653,530 B2 * | 1/2010 | Carter et al. ..................... | 704/9 |
| 7,788,262 B1 * | 8/2010 | Shirwadkar ................... | 707/737 |
| 7,809,551 B2 * | 10/2010 | Sandor et al. .................... | 704/9 |
| 7,844,594 B1 * | 11/2010 | Holt et al. ..................... | 707/709 |
| 7,923,265 B2 * | 4/2011 | Lin et al. ....................... | 438/14 |
| 7,991,609 B2 * | 8/2011 | Brockett et al. ................ | 704/9 |
| 8,005,665 B2 * | 8/2011 | Chaney et al. .................. | 704/9 |
| 8,028,226 B2 * | 9/2011 | Boguraev et al. ............ | 715/200 |
| 8,037,018 B2 * | 10/2011 | Waldo et al. ................. | 707/609 |

(Continued)

OTHER PUBLICATIONS

J. Goldstein, M. Kantrowitz, V. O. Mittal, and J. Carbonell. Summarizing Text Documents: Sentence Selection and Evaluation Metrics. In Proceedings of SIGIR—99, Berkeley, CA, Aug. 1999.*

(Continued)

Primary Examiner — Pierre-Louis Desir
Assistant Examiner — Fariba Sirjani
(74) Attorney, Agent, or Firm — Fay Sharpe LLP

(57) ABSTRACT

A system and method are provided for processing an input document which enable assessment of the coherence of an abstract of the document. The method includes storing the document in memory and, for each sentence of the abstract, comparing the sentence with sentences of a main body of the document using textual entailment techniques to identify whether the sentence of the abstract entails a sentence in the main body of the document. Links can then be generated between the entailing sentences of the abstract and the corresponding entailed sentences of the document. The document and generated links are output. The links enable the coherence of the abstract to be evaluated, either manually or automatically, using an evaluation component of the system.

23 Claims, 5 Drawing Sheets

(56) References Cited

U.S. PATENT DOCUMENTS

| | | | |
|---|---|---|---|
| 8,131,536 B2* | 3/2012 | Weischedel et al. | 704/5 |
| 8,260,817 B2* | 9/2012 | Boschee et al. | 707/794 |
| 8,442,812 B2* | 5/2013 | Ehsani et al. | 704/9 |
| 2002/0052901 A1* | 5/2002 | Guo et al. | 707/531 |
| 2002/0073235 A1* | 6/2002 | Chen et al. | 709/246 |
| 2002/0138528 A1* | 9/2002 | Gong et al. | 707/530 |
| 2003/0130837 A1* | 7/2003 | Batchilo et al. | 704/9 |
| 2003/0167245 A1* | 9/2003 | Murata | 706/46 |
| 2004/0024747 A1* | 2/2004 | Boguraev et al. | 707/3 |
| 2004/0078192 A1* | 4/2004 | Poltorak | 704/9 |
| 2005/0058978 A1* | 3/2005 | Benevento, II | 434/362 |
| 2005/0076000 A1* | 4/2005 | Sweet et al. | 707/1 |
| 2005/0091203 A1* | 4/2005 | Liu et al. | 707/3 |
| 2005/0096897 A1* | 5/2005 | Ando et al. | 704/4 |
| 2005/0203970 A1* | 9/2005 | McKeown et al. | 707/203 |
| 2007/0061356 A1* | 3/2007 | Zhang et al. | 707/102 |
| 2007/0106491 A1* | 5/2007 | Carter et al. | 704/4 |
| 2007/0179776 A1 | 8/2007 | Segond et al. | |
| 2007/0219970 A1* | 9/2007 | Dunie et al. | 707/3 |
| 2007/0255555 A1 | 11/2007 | Crouch et al. | |
| 2008/0021701 A1* | 1/2008 | Bobick et al. | 704/9 |
| 2008/0027926 A1* | 1/2008 | Diao et al. | 707/5 |
| 2008/0154578 A1* | 6/2008 | Xu et al. | 704/4 |
| 2008/0270119 A1* | 10/2008 | Suzuki | 704/9 |
| 2008/0319978 A1 | 12/2008 | Brun et al. | |
| 2009/0012842 A1* | 1/2009 | Srinivasan et al. | 705/10 |
| 2009/0063426 A1* | 3/2009 | Crouch et al. | 707/3 |
| 2009/0176198 A1* | 7/2009 | Fife et al. | 434/353 |
| 2009/0204596 A1 | 8/2009 | Brun et al. | |
| 2009/0222717 A1* | 9/2009 | Nelson | 715/207 |
| 2009/0300486 A1* | 12/2009 | Zhu et al. | 715/254 |
| 2009/0327878 A1* | 12/2009 | Grandison et al. | 715/256 |
| 2010/0031142 A1* | 2/2010 | Nagatomo | 715/254 |
| 2010/0063799 A1* | 3/2010 | Jamieson | 704/9 |
| 2010/0131509 A1* | 5/2010 | Acharya | 707/740 |
| 2010/0138216 A1* | 6/2010 | Tanev | 704/9 |
| 2010/0145678 A1* | 6/2010 | Csomai et al. | 704/9 |
| 2010/0250340 A1* | 9/2010 | Lee et al. | 705/10 |
| 2010/0305942 A1* | 12/2010 | Chaney et al. | 704/9 |
| 2011/0099134 A1* | 4/2011 | Shirwadkar et al. | 706/12 |
| 2011/0144978 A1* | 6/2011 | Tinkler | 704/10 |
| 2011/0276322 A1* | 11/2011 | Sandor et al. | 704/9 |
| 2011/0288852 A1* | 11/2011 | Dymetman et al. | 704/4 |
| 2011/0320186 A1* | 12/2011 | Butters et al. | 704/9 |
| 2012/0053930 A1* | 3/2012 | Bangalore et al. | 704/9 |
| 2012/0064501 A1* | 3/2012 | Sukkarieh | 434/353 |
| 2012/0095751 A1* | 4/2012 | Peters et al. | 704/9 |
| 2012/0109642 A1* | 5/2012 | Stobbs et al. | 704/9 |

OTHER PUBLICATIONS

Hovy, E.H. and Chin-Yew Lin. 1998. Automated Text Summarization and the SUMMARIST system. TIPSTER Text Program Phase III final report, Oct. 1998.*

Lin, Chin-Yew and E.H. Hovy. Automatic Evaluation of Summaries Using N-gram Co-occurrence Statistics. In Proceedings of 2003 Language Technology Conference (HLT-NAACL 2003), Edmonton, Canada, May 27-Jun. 1, 2003.*

Maria Fuentes, Horacio Rodriguez. "Using cohesive properties of text for Automatic Summarization". In Proceedings of the Primeras Jornadas de Tratamiento y Recuperación de Información, Valencia, Spain, 2002.*

Herrera, J., et al., "Textual Entailment Recognition Based on Dependency Analysis and WordNet," Proceedings of the 1st PASCAL Challenges Workshop on Recognising Textual Entailment, pp. 21-24, Southampton, UK, Apr. 2005.*

Mani, I. (2001). Summarization Evaluation: An Overview. In Proceedings of the NTCIR Workshop 2 Meeting on Evaluation of Chinese and Japanese Text Retrieval and Text Summarization. Tokyo: National Institute of Informatics.*

Mani, I., Firmin, T., House, D., Chrzanowski, M., Klein, G., Hirschman, L., Sundheim, B., Obrst, L. Mani, I., Firmin, T., House, D., Chrzanowski, M., Klein, G., Hirschman, L., Sundheim, B., Obrst, L. (1998). The TIPSTER SUMMAC Text Summarization Evaluation: Final Report, MITRE Technical Report MTR 98W0000138, 1998.*

Hovy, E.H. 2005. Automated Text Summarization. In R. Mitkov (ed), The Oxford Handbook of Computational Linguistics, pp. 583-598. Oxford: Oxford University Press.*

"Multiple alternative sentence compressions and word-pair antonymy for automatic text summarization and recognizing textual entailment.", Saif Mohammad, Bonnie Dorr, Melissa Egan, Jimmy Lin, and David Zajic. Proceedings of the Text Analysis Conference (TAC-2008), Nov. 2008, Gaithersburg, MD.*

Iftene, A. 2009. Textual Entailment. PhD Thesis. "Al. I. Cuza" University. Mar. 13, 2009. Iasi, Romania.*

Danilo Giampiccolo , Bernardo Magnini , Ido Dagan , Bill Dolan, "The third PASCAL recognizing textual entailment challenge (2007)" In Proceedings of the ACLPASCAL Workshop on Textual Entailment and Paraphrasing, Prague, Jun. 2007, pp. 1-9.*

Ido Dagan , Oren Glickman, Bernardo Magnini, "The pascal recognising textual entailment challenge (2005)" in Proceedings of the PASCAL Challenges Workshop on Recognising Textual Entailment.*

Chierchia, et al. "Meaning and grammar: An introduction to semantics" 2nd. Edition. Cambridge, MA: MIT Press (2001) (Abstract only).

Dagan, et al. "The PASCAL Recognising Textual Entailment Challenge," Lecture Notes in Computer Science, No. 3944, pp. 177-190, Springer-Verlag (2006).

Aït-Mokhtar, et al., "Incremental Finite-State Parsing," Proceedings of Applied Natural Language Processing, Washington, (1997).

Aït-Mokhtar, et al., "Subject and Object Dependency Extraction Using Finite-State Transducers," Proceedings ACL '97 Workshop on Information Extraction and the Building of Lexical Semantic Resources for NLP Applications, Madrid, (1997).

Aït-Mokhtar, et al., "Robustness beyond Shallowness: Incremental Dependency Parsing," Special issue of NLE journal (2002).

Hirst, et al., "Lexical chains as representations of context for the detection and correction of malapropisms," in Fellbaum, pp. 305-332 (1998).

Nakov, et al. "Citances: Citation Sentences for Semantic Analysis of Bioscience Text," Proceedings of the SIGIR '04 workshop on Search and Discovery in Bioinformatics (2004).

Glickman, et al. "Web based probabilistic textual entailment," LNAI, vol. 3944, pp. 287-298. Springer-Verlag (2006).

Adams, et al. "Textual Entailment Through Extended Lexical Overlap and Lexico-Semantic Matching," Proc. ACL-PASCAL Workshop on Textual and Entailment and Paraphrasing (2007).

Lin, et al., "Discovery of inference rules for question answering," Natural Language Engineering, 4(7): 343-360 (2001).

Hickl, et al. "Recognizing Textual Entailment with LCC's Groundhog System," Proceedings of the Second PASCAL Challenges Workshop (2006).

Cabrio, et al. "Combining specialized entailment engines for RTE-4," Proceedings of TAC (2008).

Dundar, et al. "Case study of the comparison of data from conference abstracts and full-text articles in health technology assessment of rapidly evolving technologies: Does it make a difference?" International Journal of Technology Assessment in Health Care (2006) (Abstract only).

Langdorf, et al. "Turning Your Abstract into a Paper: Academic Writing Made Simpler," West J Emerg Med. (May 2009).

Ward L. G., "Accuracy of abstracts for original research articles in pharmacy journals," The Annals of Pharmacotherapy: vol. 38, No. 7 (2004).

* cited by examiner

| PAIR NO. | ABSTRACT SENTENCE | CORRESPONDING SENTENCE IN THE ARTICLE BODY |
|---|---|---|
| 1 | THE PRESENT STUDY FOCUSES ON THE INTRICATE RELATIONSHIP BETWEEN[1] HUMAN BODY MOVEMENT[2] AND MUSIC[3], IN PARTICULAR ON HOW MUSIC MAY INFLUENCE THE WAY HUMANS WALK. | THERE IS A CLOSE RELATIONSHIP BETWEEN[1] MUSIC[3] AND BODY MOVEMENT[2]. |
| 2 | THE PRESENT STUDY FOCUSES ON THE INTRICATE RELATIONSHIP BETWEEN[1] HUMAN BODY MOVEMENT[2] AND MUSIC[3], IN PARTICULAR ON[4] HOW MUSIC MAY INFLUENCE THE WAY HUMANS WALK[5]. | IN ORDER TO STUDY BOTH THE SYNCHRONIZATION AND THE SPATIALIZATION ASPECT OF[1A] MOVING[2] ON[1B] MUSIC[3], WE FOCUSED ON[4] A BASIC MOVEMENT PATTERN THAT NEARLY ALL HUMANS PERFORM IN DAILY LIFE, NAMELY WALKING[5]. |
| 3 | IN AN EXPERIMENT, PARTICIPANTS[1] WERE ASKED[2] TO SYNCHRONIZE THEIR WALKING TEMPO[3] WITH[4] THE TEMPO OF MUSICAL[5] AND METRONOME STIMULI. | PARTICIPANTS[1] WERE[2A] EXPLICITLY INSTRUCTED[2B] TO SYNCHRONIZE THEIR WALKING TEMPO[3] WITH[4] THE PERCEIVED MUSICAL PULSE[5], THAT IS, WITH THE FIRST SPONTANEOUSLY PERCEIVED TEMPO. |
| 4 | THE WALKING TEMPO[1] AND WALKING SPEED WERE MEASURED[2]. | WALKING TEMPO[1] WAS MEASURED[2] BY PUTTING A SMALL MP3 RECORDER (SAMSUNG YP-F1, WEIGHT: 30 g) ON ONE OF THE PARTICIPANTS SHOES AND RECORDING THE SOUND OF THE FOOTSTEPS IN WAVE FORMAT (8000 Hz, 16 BIT, MONO). |
| 5 | THE WALKING TEMPO AND WALKING SPEED[1] WERE MEASURED[2]. | WALKING SPEED[1] WAS MEASURED[2] WITH A GPS DEVICE (GARMIN FORERUNNER 305, GPS VELOCITY INACCURACY <0.05 m/s). |
| 6 | THE TEMPO OF THE STIMULI[1] VARIED BETWEEN[2A] 50[3A] AND[2B] 190 BEATS PER MINUTE[3B]. | THE TEMPO[1] RANGED FROM[2A] 50 BPM[3A] TO[2B] 190 BPM[3B]. |

FIG. 4A

| | | |
|---|---|---|
| 7 | THE DATA REVEALED THAT PEOPLE <u>WALK</u>[1] <u>FASTER ON</u>[2A] <u>MUSIC</u>[3] <u>THAN ON</u>[2B] <u>METRONOME STIMULI</u>[4] AND THAT WALKING ON MUSIC CAN BE MODELED AS A RESONANCE PHENOMENON THAT IS RELATED TO THE PERCEPTUAL RESONANCE PHENOMENON AS DESCRIBED BY VAN NOORDEN AND MOELANTS (VAN NOORDEN, L., & MOELANTS, D. 1999). | AN INDEPENDENT t TEST FOR EQUAL VARIANCES INDICATED THAT OVER ALL TEMPO THE <u>WALKING SPEED</u>[1] <u>ON</u>[2A] <u>THE METRONOME STIMULI</u>[4] WAS SIGNIFICANTLY <u>LOWER THAN ON</u>[2B] <u>THE MUSICAL STIMULI</u>[3], t(1160) = 3.929, p < .01 (AN ALPHA LEVEL OF .05 WAS USED, TWO-TAILED TEST). |
| 8 | THE DATA REVEALED THAT <u>PEOPLE WALK FASTER</u>[1] ON <u>MUSIC</u>[2] THAN ON METRONOME STIMULI AND THAT WALKING ON MUSIC CAN BE MODELED AS A RESONANCE PHENOMENON THAT IS RELATED TO THE PERCEPTUAL RESONANCE PHENOMENON AS DESCRIBED BY VAN NOORDEN AND MOELANTS (VAN NOORDEN, L., & MOELANTS, D. 1999). | THUS, THE <u>MUSIC</u>[2] MADE <u>PEOPLE WALK FASTER</u>[1]. |
| 9 | THE DATA REVEALED THAT PEOPLE WALK FASTER ON MUSIC THAN ON METRONOME STIMULI AND THAT WALKING ON MUSIC CAN BE MODELED AS A <u>RESONANCE PHENOMENON</u>[1] THAT <u>IS RELATED TO</u>[2] THE <u>PERCEPTUAL RESONANCE PHENOMENON</u>[3] AS DESCRIBED BY VAN NOORDEN AND MOELANTS (VAN NOORDEN, L., & MOELANTS, D. 1999). | FINALLY, WE ANALYZED THE STEP SIZE AS A FUNCTION OF THE WALKING TEMPO FOR EACH PARTICIPANT INDIVIDUALLY, AND APPROACHED THE SPATIALIZATION ASPECT IN TERMS OF THE <u>RESONANCE PHENOMENON</u>[1] THAT WAS FOUND TO <u>PLAY A ROLE IN</u>[2] <u>MUSIC PERCEPTION</u>[3] (VAN NOORDEN & MOELANTS, 1999). |

FIG. 4B

TEXTUAL ENTAILMENT METHOD FOR LINKING TEXT OF AN ABSTRACT TO TEXT IN THE MAIN BODY OF A DOCUMENT

BACKGROUND

The exemplary embodiment relates to a method for linking text strings in a document abstract to corresponding text in the main body of the document. It finds particular application in the evaluation of the cohesiveness of an abstract and in the navigation of documents, such as journal articles.

Abstracts are widely used in research articles and other documents to provide a summary of the research article, which is described in detail in the text and any accompanying drawings in the main body of the article. Formally, an abstract can be defined as "an abbreviated, accurate representation of the contents of a document, without added interpretation or criticism, and without distinction as to who wrote the Abstract" (International Standard ISO-214). Abstracts have been said to have four functions: as stand-alone mini-texts, giving readers a short summary of a study's topic, methodology and main findings; as screening devices, helping readers decide whether to read the whole article; as previews for readers intending to read the whole article, giving them a road-map for their reading; and in providing indexing help for professional abstract writers and editors. (see, Huckin, T. Abstracting from Abstracts, in M. Hewings, Ed., Academic Writing in Context, pp. 93-103 (2001)).

Due to these functions of the abstract, the text is often present as meta-data in dedicated content repositories of academic articles. This means that, in contrast to the full text, the abstract plays a key role in information retrieval. Thus, the quality of the abstract is of primary importance both for the readers and the authors. It is often the case, however, that the abstract does not parallel the body of the paper in content and order. Sentences from the abstract and the text rarely have an exact or even a fuzzy match with each other. There may also be inconsistencies in the data presented in the abstract and main body text. Testing the coherence of the abstract and the article body would be manually intensive work, and consequently it has not been carried out systematically.

There remains a need for automated or semi-automated methods for evaluating the coherence of an abstract and its relationship to the main body.

INCORPORATION BY REFERENCE

The following references, the disclosures of which are incorporated herein by reference in their entireties, are mentioned:

U.S. Pub. No. 2009/0176198, published Jul. 9, 2009, entitled REAL NUMBER RESPONSE SCORING METHOD, by James H. Fife, et al., discloses a method of generating a real number score for a response, such as a written essay response. The method comprises providing a scoring model having one or more concepts, determining for each concept a probability that the concept is present in the response, creating a scoring rule or scoring rule function, determining an expected value function for the scoring rule, and generating a real number score for the response based on the scoring rule, the expected value function, and the probabilities that the concepts are present in the response (or a combination thereof).

U.S. Pub. No. 2007/0255555, published Nov. 1, 2007, entitled SYSTEMS AND METHODS FOR DETECTING ENTAILMENT AND CONTRADICTION, by Richard S. Crouch, et al., discloses techniques for detecting entailment and contradiction.

U.S. Pat. No. 7,058,567, issued Jun. 6, 2006, entitled NATURAL LANGUAGE PARSER, by Aït-Mokhtar, et al., discloses a parser for syntactically analyzing an input text string. The parser applies a plurality of rules which describe syntactic properties of the language of the input text string.

BRIEF DESCRIPTION

In accordance with one aspect of the invention, a document processing method includes storing a document in memory of a computer system and, for each sentence of an abstract of the document, comparing the sentence with sentences of a main body of the document using textual entailment techniques to identify whether the sentence of the abstract entails a sentence in the main body of the document. Links between the entailing sentences of the abstract and the corresponding entailed sentences of the document are generated and output.

In another aspect a computer system includes memory for storing a document and an entailment component implemented in hardware and software which, for each sentence of an abstract of the document, compares the sentence with sentences of a main body of the document using textual entailment techniques to identify whether the sentence of the abstract entails a sentence in the main body of the document. The system further includes at least one of a) a link generator implemented in hardware and software which generates links between the entailing sentences of the abstract and the corresponding entailed sentences of the document, and b) an evaluation component which evaluates the cohesiveness of the abstract based on whether fewer than all the sentences of the abstract are identified as entailing at least one sentence of the main body of the document. An output is provided for outputting at least one of the generated links and the cohesiveness evaluation.

In another aspect, a method for evaluating a cohesiveness of a document abstract includes natural language processing the document with a parser, identifying whether each sentence of the document abstract entails at least one sentence of a main body of the document, with a processor of a computer system, evaluating the cohesiveness of the abstract based on whether fewer than all the sentences of the abstract are identified as entailing at least one sentence of the main body of the document, and outputting a measure of the cohesiveness.

BRIEF DESCRIPTION OF THE DRAWINGS

FIG. 4 illustrates an example of an abstract and sentences of a main body of an article which are potentially entailed by sentences of the abstract.

DETAILED DESCRIPTION

Figure 1:
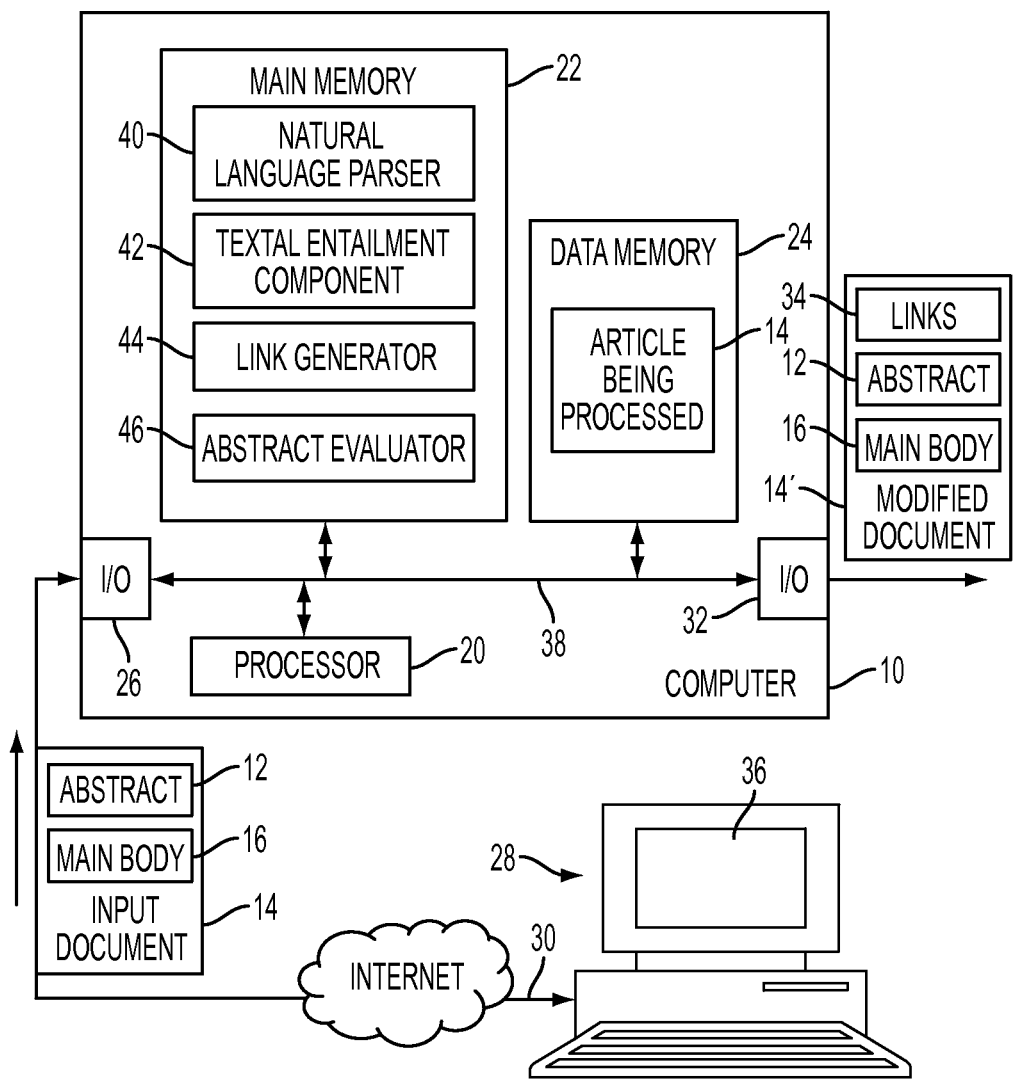
FIG. 1 is a functional block diagram of a computer system for evaluating textual entailment.

Aspects of the exemplary embodiment relate to a computer system and to a document processing method which apply textual entailment techniques for pairing sentences of an abstract with corresponding entailed sentences of a main body of a document which can be used to create links between the two and to evaluate the cohesiveness of the abstract.

Working on the assumption that an abstract is generally a summary of an entire article of which it forms a part, the parts of the abstract can be assumed to correspond to parts of the article main body. In the present exemplary embodiment, the relationship between the parts of the abstract and the parts of the article body is considered to be one of textual entailment. The exemplary method and apparatus employ textual entailment techniques for automatically linking the corresponding parts to each other. The exemplary method can be used for the automatic evaluation of abstract coherence as well as for other applications, such as article-internal navigation.

By way of example, TABLE 1 shows the sentences of an abstract of an illustrative article (Styns, F., Van Noorden, L., Moelants, D., and Leman, M., Walking on Music. Human Movement Science, 26, 769-785 (2007) Copyright© 2007 Elsevier B.V.) and the sentences of the body of this article to which these sentences are most likely to correspond.

TABLE 1

| Abstract Sentence (T) | Corresponding sentence in the article body (C) |
|---|---|
| The present study focuses on the intricate relationship between human body movement and music, in particular on how music may influence the way humans walk. | There is a close relationship between music and body movement. |
| The present study focuses on the intricate relationship between human body movement and music, in particular on how music may influence the way humans walk. | In order to study both the synchronization and the spatialization aspect of moving on music, we focused on a basic movement pattern that nearly all humans perform in daily life, namely walking. |
| In an experiment, participants were asked to synchronize their walking tempo with the tempo of musical and metronome stimuli. | Participants were explicitly instructed to synchronize their walking tempo with the perceived musical pulse, that is, with the first spontaneously perceived tempo. |
| The walking tempo and walking speed were measured. | Walking tempo was measured by putting a small mp3 recorder (Samsung YP-F1, weight: 30 g) on one of the participants shoes and recording the sound of the footsteps in wave format (8000 Hz, 16 bit, mono). |
| The walking tempo and walking speed were measured. | Walking speed was measured with a GPS device (Garmin Forerunner 305, GPS velocity inaccuracy <0.05 m/s). |
| The tempi of the stimuli varied between 50 and 190 beats per minute. | The tempo ranged from 50 BPM to 190 BPM. |
| The data revealed that people walk faster on music than on metronome stimuli and that walking on music can be modeled as a resonance phenomenon that is related to the perceptual resonance phenomenon as described by Van Noorden and Moelants (Van Noorden, L., & Moelants, D. (1999). | An independent t test for equal variances indicated that over all tempi the walking speed on the metronome stimuli was significantly lower than on the musical stimuli, t(1160) = 3.929, p < .01 (an alpha level of .05 was used, two-tailed test). |
| The data revealed that people walk faster on music than on metronome stimuli and that walking on music can be modeled as a resonance phenomenon that is related to the perceptual resonance phenomenon as described by Van Noorden and Moelants (Van Noorden, L., & Moelants, D. (1999). | Thus, the music made people walk faster. |
| The data revealed that people walk faster on music than on metronome stimuli and that walking on music can be modeled as a resonance phenomenon that is related to the perceptual resonance phenomenon as described by Van Noorden and Moelants (Van Noorden, L., & Moelants, D. (1999). | Finally, we analyzed the step size as a function of the walking tempo for each participant individually, and approached the spatialization aspect in terms of the resonance phenomenon that was found to play a role in music perception (Van Noorden & Moelants, 1999). |

Principles of Textual Entailment

In formal semantics, an entailment relation is defined as the following:
A entails B if:
a. Whenever A is true, B is true.
b. The information that B conveys is contained in the information that A conveys.
c. A situation describable by A must also be a situation describable by B.
d. A and not B is contradictory (cannot be true in any situation).

where A and B are different text strings, such as sentences. (See, Chierchia, G., McConnell-Ginet, S.: Meaning and grammar: An introduction to semantics, 2nd. Edn. Cambridge, Mass.: MIT Press (2001)).

The present textual entailment method, however, relaxes these conditions by not requiring that each of these four definitions must be obeyed under all circumstances. Consider the following pairs of sentences:

(1) John is 25 years old.
(2) John is younger than 30.
(3) The Dalai Lama today called for Tibetans to end protests against the Beijing Olympics, also telling MPs in London he would happily accept an invitation to attend the event if relations with China improved.
(4) China hosts the Olympic Games.

According to the formal definition, sentence (1) entails sentence (2) and sentence (3) entails sentence (4). A system which is able to recognize such relations is quite useful for many text processing tasks. For example, in information extraction, given one simple hypothesis text segment, it allows extraction of all the text segments that entail this hypothesis. The formal definition, however, is too strict for real text processing where modality and subjective points of view are ubiquitous. Consider the pairs:

(2) John is younger than 30.
(5) John may be about 20, 25 years old.
(6) After his release, the man told reporters outside his home that he had nothing to do with the July 7 transit attacks, which killed 52 people (last estimation) and the four bombers.
(7) 52 people and four bombers were killed on July 7.

Following the formal definition, (5) does not entail (2) because it contains the modal verb "may," implying that John could be 30 or over, thus requirement c) for strict entailment is not met. Similarly, (6) does not entail (7) because the mention of "last estimation" expresses uncertainty concerning the number of killed people.

For the present application, a more flexible definition of the entailment relation is employed that allows an entailment relation between (2) and (5) and between (6) and (7). Under this more flexible approach, textual entailment is defined as a directional relationship between pairs of text expressions, denoted by T—the entailing Text of the abstract, and C—the Candidate entailed text of the main body. Under this more flexible definition, T entails C if a human reading T would typically infer that C is most likely true. See, for example, Dagan, I. Glickman, O. Magnini, B, The PASCAL Recognising Textual Entailment Challenge, in LECTURE NOTES IN COMPUTER SCIENCE, No. 3944, pages 177-190, SPRINGER-VERLAG, 2006 (hereinafter, Dagan, et al.), where a similar methodology is applied to conclusions and hypotheses. Note that entailment may be considered a form of one directional paraphrasing—it only requires that T entails C, and not necessarily the reverse. The exemplary system and method implement rules and thresholds, where appropriate, which provide when such a definition is met by a text string T of an abstract and a candidate entailed text string C of the main body of the same document.

FIG. 1 is a functional block diagram of a computer system 10 which is configured for linking text strings of an abstract 12 of an input digital document 14 to text strings in the main body 16 of the document 14. In general, the text strings can be sentences in a natural language, such as English or French, although shorter strings, such as clauses and phrases, are also contemplated. The digital document 14 can be in any format suitable for processing by the system, such as a Word document, PDF, or markup language document, such as one in HTML (Hypertext Markup Language), extended markup language (XML) SGML (Standardized General Markup Language), or the like, and may be, for example, a research article, thesis, research proposal, or the like which is to be or has been made accessible to searchers, e.g., via a journal website, web address, company database, or the like.

The illustrated computer system 10 includes a processor 20, which controls the overall operation of the computer system 10 by execution of processing instructions which are stored in main memory 22 connected to the processor 20. A digital document 14 undergoing processing by the system 10 may be stored in data memory 24. Computer system 10 also includes a network interface 26 for receiving a digital document 14 from a document source 28, such as a personal computer, web server, portable memory storage device, scanner, or the like, e.g., via a wired or wireless connection 30.

An interface 32 outputs a document 14' which has been processed by the system 10, which may include, within the document, or in a separate file, links 34 between abstract text strings and text strings of the main body. The links may be in the form or metadata, hypertext, or the like. The interface 32 which may be the same as or separate from interface 26, may output the processed document to a graphical user interface (GUI) which includes a display 36. The GUI may be hosted by a personal computer 28 for displaying the links to a user for evaluation of the quality of the abstract, for displaying a report on the abstract cohesiveness, and/or to allow the user to navigate the document 14' via the links 34. The various components 20, 22, 24, 26 32 of the computer system 10 may be connected by a bus 38.

Figure 2:
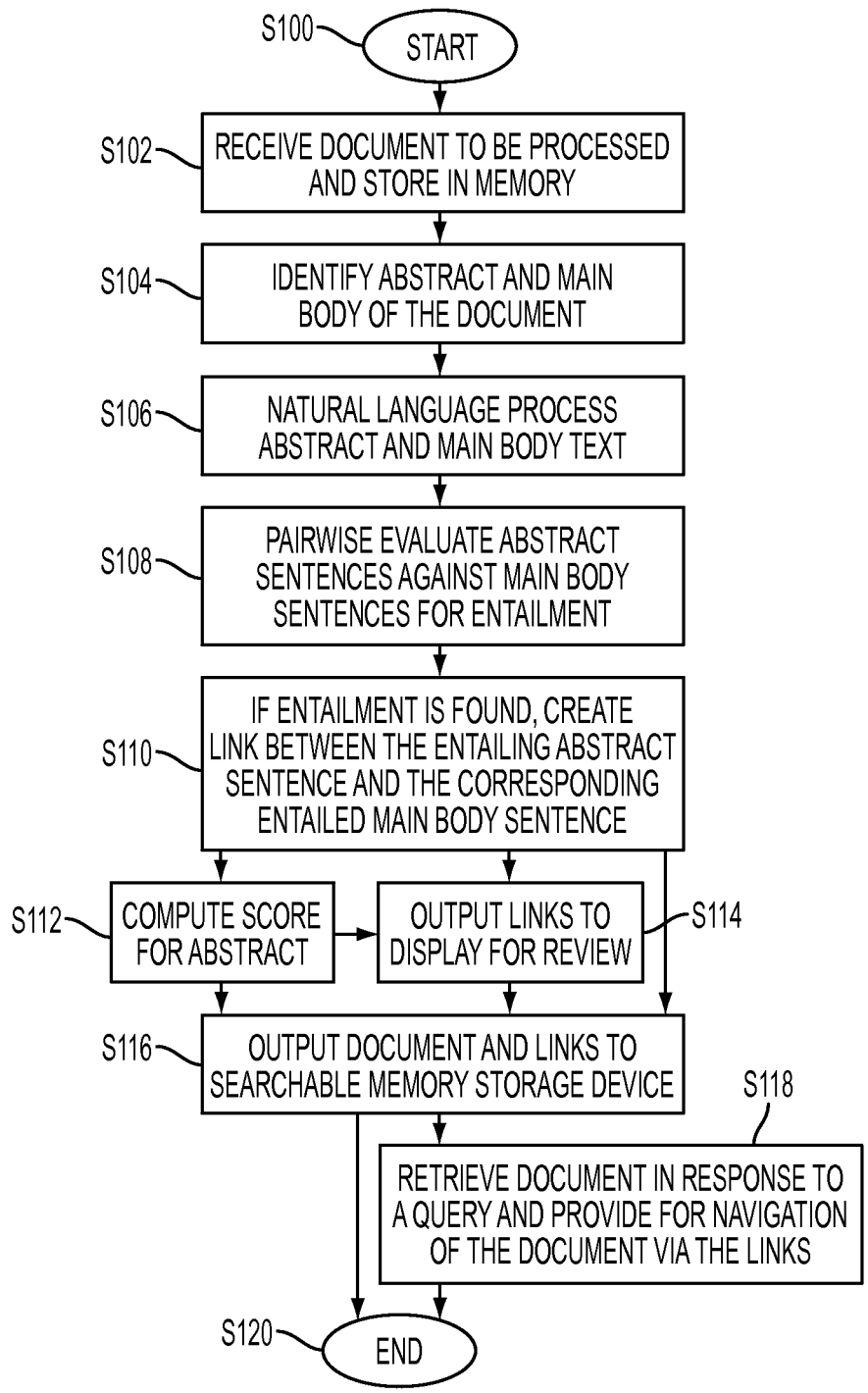
FIG. 2 is a flow chart illustrating a method for evaluating textual entailment.

The processor 20 executes instructions stored in memory 22 for performing the method outlined in FIG. 2. In particular, memory 22 stores various software processing components including a natural language parser 40, an entailment component 42, a link generator 44, and optionally, an abstract evaluator 46. However, it is to be appreciated that while separate software components are shown, these may be combined or split or interact with remotely located software components in performance of the method.

Briefly, the natural language parser 40 treats each sentence as a sequence of tokens and, during parsing of the document, annotates the text strings T of the abstract and text strings C of the main body of the document with tags (labels) which correspond to grammar rules, such as lexical rules, syntactic rules, and dependency (semantic) rules. The lexical rules define relationships between words by the order in which they may occur or the spaces between them. Syntactic rules describe the grammatical relationships between the words, such as noun-verb, adjective-noun. Semantic rules include rules for extracting dependencies (subject-verb relationships, object-verb relationships, etc.), named entities and co-reference links. In some embodiments, the parser 40 comprises an incremental parser, as described, for example, in above-mentioned U.S. Pat. No. 7,058,567 by Aït-Mokhtar, et al.; Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997. Further details on deep syntactic parsing which may be applied herein are provided in U.S. Pub. No. 2007/0179776, by Segond, et al. and U.S. Pub. No. 2009/0204596, by Brun et al., the disclosures of which are incorporated herein by reference, and in Aït-Mokhtar, et al., "Robustness beyond Shallowness: Incremental Dependency Parsing," Special issue of NLE journal (2002); and Ait-Mokhtar, et al. "Incremental Finite-State Parsing," Proceedings of Applied Natural Language Processing, Washington, April 1997.

The entailment component 42 may be separate from the parser 40 or in the form of rules written on top of the parser rules. The entailment component includes instructions for applying several techniques for identifying textual entailment, which are applied through pairwise comparison of each sentence of the abstract with each sentence of the main body. The entailment component outputs a list of text strings T and corresponding candidate strings C which meet the requirements for entailment.

The link generator 44 provides links between each of the output entailing text strings T and corresponding candidate text string C output by the entailment component. The link generator 44 may also flag sentences T of the abstract for which no link is generated.

The abstract evaluator 46 provides a score for the abstract, based on whether the abstract sentences all entail a main body sentence. Other factors may be considered in the scoring, such as a similarity measure between the entailing and entailed sentences, and whether the entailed sentences are distributed fairly homogeneously throughout the document (too high a concentration in one section may be used as an indicator that the abstract does not reflect the entire document).

The computer system 10 may comprise one or more computing devices, such as a PC, such as a desktop, a laptop, palmtop computer, portable digital assistant (PDA), server computer, cellular telephone, pager, or other computing device capable of executing instructions for performing the exemplary method. In one embodiment, the source computer 28 may host the computer system 10.

The memory 22, 24 may represent any type of tangible computer readable medium such as random access memory (RAM), read only memory (ROM), magnetic disk or tape, optical disk, flash memory, or holographic memory. In one embodiment, the memory 22, 24 comprises a combination of random access memory and read only memory. In some embodiments, the processor 20 and memory 22 may be combined in a single chip.

The network interface 26, 32 allows the computer to communicate with other devices via a computer network, such as a local area network (LAN) or wide area network (WAN), or the internet, and may comprise a modulator/demodulator (MODEM).

The digital processor 20 can be variously embodied, such as by a single-core processor, a dual-core processor (or more generally by a multiple-core processor), a digital processor and cooperating math coprocessor, a digital controller, or the like. The exemplary digital processor 20, in addition to controlling the operation of the computer 10, executes instructions stored in memory 22 for performing the method outlined in FIG. 2.

As will be appreciated, FIG. 1 is a high level functional block diagram of only a portion of the components which are incorporated into a computer system 10. Since the configuration and operation of programmable computers are well known, they will not be described further.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates a method for evaluating an abstract through creation of links. The method begins at S100.

At S102, a document, such as a research article, to be processed is input to the computer system 10, or generated within the computer system, and stored in memory.

At S104, the abstract 12 and main body 16 of the article are identified. The two parts 12, 16 may be identified as such within the document 14, e.g., by metadata. Alternatively, simple word processing techniques, such as looking for the word "Abstract" and selecting the text block closest below it as the abstract, may be used. The main body 16 of the document can then be considered as being all subsequent text, optionally excluding any References section.

At S106, the abstract 12 and main body 16 text is natural language processed by the parser 40. Each sentence is treated as a sequence of tokens which are assigned parts of speech and relationships between tokens identified, such as predicate-argument relationships and the like.

At S108, for each sentence in the Abstract 12, each of the set of sentences forming the main body 16 is evaluated, using entailment techniques, to see if the Abstract sentence T entails the respective main body sentence C. Several matching techniques may be applied in this step, as described in greater detail below, including exact matching, lexical matching, syntactic matching, lexico-syntactic matching, referent matching, and the like. Some of the techniques may operate on the output of other techniques. Thresholds may be applied for each technique separately, or in combination. A determination is made as to whether the main body sentence C is entailed based on the matching expression(s) identified. Where two or more sentences C are entailed, the system may output all of them, or only a subset comprising the highest scoring one(s).

At S110, links are created between the entailing abstract sentence and the entailed main body sentence. In some cases, not all sentences of the abstract may be entailed.

Optionally, at S112, a score may be computed by the abstract evaluator 46 and output.

Optionally, at S114, the document links may be presented to a human reviewer for evaluation and confirmation. This may be particularly useful where one or more of the abstract sentences does not entail a main body sentence (according to the techniques used in S108).

At S116, the document 14', together with the generated links, is output, e.g., to a memory storage device, which is then searchable by a search engine using formulated queries based on searchers' input queries and if retrieved, the document is navigable by a searcher (S118), for example, by clicking on the displayed links.

The method ends at S120.

Figure 3:
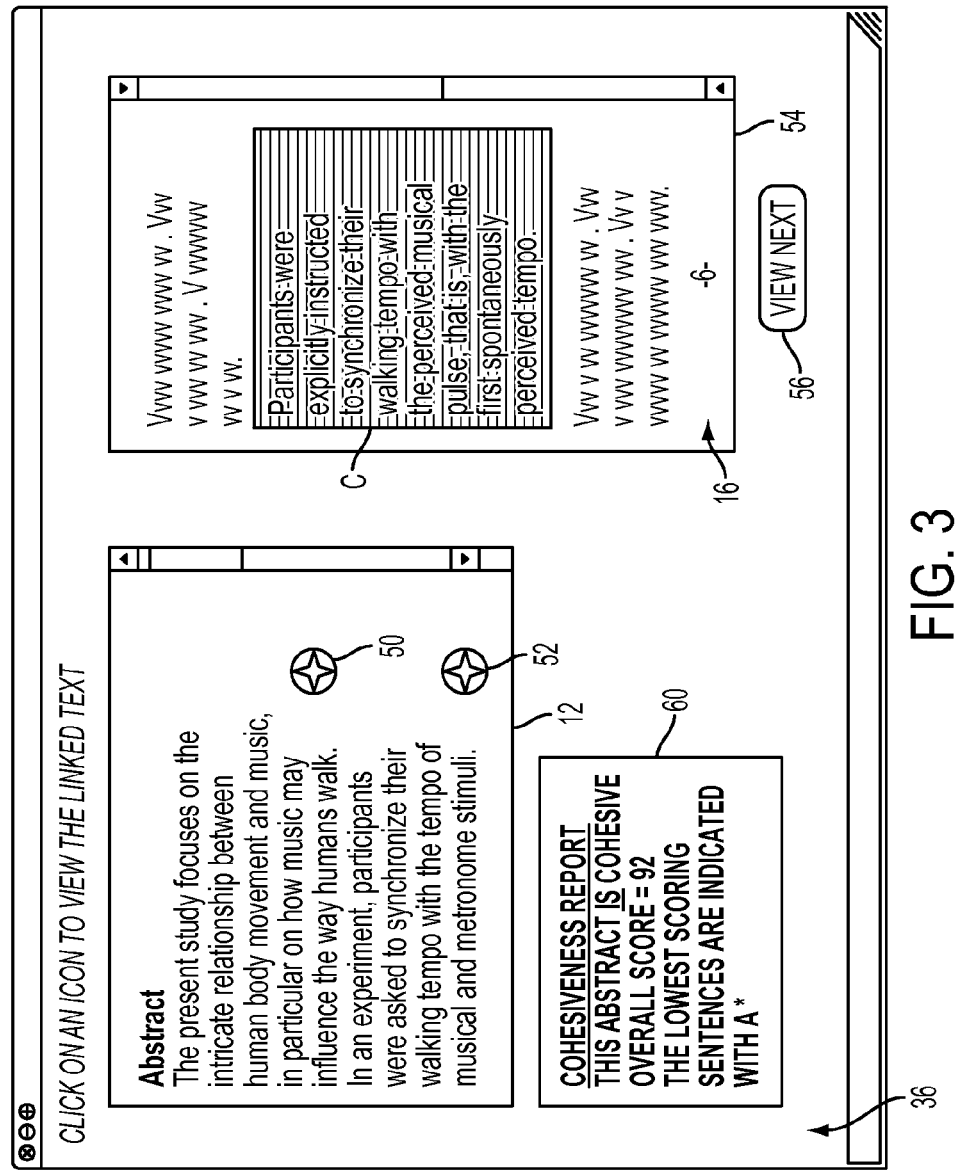
FIG. 3 illustrates a graphical user interface displaying an abstract and linked main body text.

In one embodiment, at S114 or S118, the links may be presented to the user in the form of a table in which the linked sentences are displayed. Or, the linked sentences may be highlighted on the document, e.g., with a respective color. In one embodiment, illustrated in FIG. 3, the user may click on a sentence T of the abstract or on an associated link icon 50, 52, which then shows the page 54 or section in which the linked sentence C is found, where the sentence may be highlighted or otherwise identified. For example, in FIG. 4, a user has selected the link 52 for the second sentence of the abstract and clicked on it using the computer 28's cursor control device. The main body text 16, displayed at right, jumps to the page 54 on which the first linked sentence is found, and displays at least a portion of the text on that page which includes the linked sentence C. the user may click on a "view next" button 56 to see any further main body sentences that are linked to the same abstract sentence.

If the submitter of the document 14 is the drafter, the method may be iterative. For example, if the output score at S112 is low or if the links presented to the drafter at S114 show that abstract should be revised, the user may submit a revised version of the abstract 12 to the system 10. In this case, the natural language processing of the main body 16 need not be repeated.

The method can also be used by an evaluator for evaluating the quality of an abstract 12 which has been drafted as a summary of an already-prepared main body 16. For example, it may be used by a teacher to evaluate sample abstracts written by students who are learning how to draft a well-formed abstract. The output score, which may simply be the number of abstract sentences for which there is no entailed main body sentence, can be used to assess cohesiveness of the sample abstracts.

The method may also be of benefit to an editor of a journal reviewing articles for publication. The editor may check that the abstract is coherent (all sentences entailed and/or high score). The editor can also click on the links 50, 52 to review the sentences C in the main body 16 and those around them to get a rapid indication of what the article is about.

The method illustrated in FIG. 2 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in intangible media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the linking method.

Further details of the system and method will now be described.

Textual Entailment Component 42

The exemplary system and method may utilize any suitable system(s) for recognizing Textual Entailment (TE) as the textual entailment component 42 in order to solve the problem of linking parts of abstracts to parts of article bodies. Several TE systems already exist, including those that were developed in the context of the Recognising Textual Entailment (RTE) Challenge (see, for example, Dagan, et al.), which may be used as the TE component 42, either separately or in combination.

Some of the techniques which may be employed in determining textual entailment are as follows:

1. Lexical Matching

Lexical matching aims to identify single words or expressions which have the same meaning. An external resource may be used to measure lexical similarities between tokens from the Abstract text string and a candidate entailed text string from the main body. One such lexical resource is WordNet™. For example, a similarity score based on the WordNet Path between two tokens may be determined (see, for example, Hirst G., St-Onge D., 1998. Lexical chains as representations of context for the detection and correction of malapropisms, in Fellbaum 1998, pp. 305-332).

Another kind of similarity measure which can be used in evaluating textual entailment is the lexical entailment probability. This probability is estimated by taking the page counts returned from a search engine for a combined u and v search term, and dividing it by the count for just the v term. (See, for example, Glickman O., Dagan I., Koppel M., 2006. Web based probabilistic textual entailment, in Quinonero-Candela et al., editor, MLCW 2005, LNAI, Volume 3944, pages 287-298. Springer-Verlag).

Some morphological criteria can be processed by using minimum edit distance or morphological stem equality (i.e., testing equality only between the root form of both expressions to be tested). For example, minimum edit distance is the number of changes (additions or deletions of characters) required to convert one expression to another. A threshold can be set for the minimum edit distance, below which the expressions are considered to match. More complex metrics can be used, which also take into account the length of the two expressions, whereby the threshold is effectively higher for longer expressions.

The output of the lexical matching may be a set of matching expression pairs (each comprising one or more tokens), which match according to one or more of the similarity measures, and the sentences C, T of in the main body and abstract in which they are located.

2. Syntactic Matching

Various approaches can be used to address syntactic information involved in textual entailment. Preprocessing of the abstract sentence or candidate entailed sentence can be performed to ensure that both sentences use the same voice (passive or active) e.g., by transforming an expression from a passive to an active form (e.g., the apple was eaten by the man→the man ate the apple).

In one embodiment, the syntactic matching may be combined with the lexical matching. The lexical matching provides a set of aligned pairs of tokens, one in the abstract, one in the main body. Dependency matching then considers each aligned pair with each of the other aligned pairs, and compares the set of syntactic relations between two nodes in the abstract with the set of syntactic relations between the same two nodes in the main body. As an example, consider the matching of the syntactic relations between two nodes XCo. and ACo. in the following sentences: "XCo. has closed the purchase of ACo." and "The XCo., ACo. merger is complete." Here, the two nodes are both the names of companies (i.e., named entities) although other types of nodes may also be considered which appear concurrently in an abstract sentence and a main body sentence. In the above example, the system may not identify a syntactic match, although it may identify a subject-object relation between the nodes if the second sentence was "ACo. was purchased by XCo."

For further details on syntactic matching, see Adams, R., Nicolae, G., Nicolae, C., Harabagiu, S. 2007. "Textual Entailment Through Extended Lexical Overlap and Lexico-Semantic Matching," in "Proc. ACL-PASCAL Workshop on Textual and Entailment and Paraphrasing," pp 119-124.

The output of the syntactic matching is pairs of text strings which include expressions which have the same or similar meaning, as determined by one or more of the above approaches.

3. Lexico-Syntactic Matching

This may include finding lexico-syntactic paraphrases, one in the Abstract, the other in a main body text string. As an example, predication matching involves matching the relationship between a predicate (verb or verb phrase) and its argument. If the distance between two predications is less than a threshold, the two predications are considered a match. Predicates can be considered similar and thus a match, such as "I like mushrooms" and "I love mushrooms."

Such paraphrases may be of the format (X Z Y)→(x Z' Y), where Z and Z' are each a predicate which connects arguments X and Y, which can be determined (or, in one embodiment, inferred) to have the same or similar meaning in the abstract expression and main body expression, respectively. Examples of paraphrases include "X strikes Y"→"X hits Y", or "X solved Y"→"X found a solution to Y". The Discovery of Inferential Rules from Text (DIRT) algorithm is a suitable algorithm for this type of matching (See, Lin D., Pantel P., Discovery of inference rules for question answering. Natural Language Engineering, 4(7): 343-360 (2001)). This unsupervised algorithm is based on an extended version of Harris' Distributional Hypothesis, which states that words that occur in the same contexts tend to be similar. Instead of using this hypothesis on words, the authors apply it to paths in the dependency trees of a parsed corpus.

The entailment component 42 may alternatively or additionally include a paraphrase acquisition module. This extracts paraphrases that contain pairs of aligned constituents from the World Wide Web and clusters the acquired paraphrases into sets that are presumed to convey the same content. (See, Hickl A., Williams J., Bensley J., Roberts K., Rink B., and Shi Y., 2006. Recognizing Textual Entailment with LCC's Groundhog System. In Proceedings of the Second PASCAL Challenges Workshop, hereinafter, Hickl, et al.).

The output of the lexico-syntactic matching is a set of expression pairs, one in the abstract, and another in the main body, which are inferred to be sufficiently similar to be considered a match.

4. Referent Matching

Named Entity Recognition (NER) systems and Named Entity Coreference modules may be incorporated in or accessed by the textual entailment component for referent matching. This allows matching two expressions which refer to the same entity but using different terms. For example, both may refer to a person, but one uses the person's name while the other uses the person's title or a corresponding pronoun.

In general, a named entity is a group of one or more words that identifies an entity by name. For example, named entities may include persons (such as a person's given name or title), organizations (such as the name of a corporation, institution, association, government or private organization), locations (such as a country, state, town, geographic region, or the like), artifacts (such as names of consumer products, e.g., vehicle names), specific dates, and monetary expressions. Named entities are typically capitalized in use to distinguish them from ordinary nouns. The named entity recognition system identifies named entities, e.g., through access to a lexical resource, such as WordNet™ and tags them as such.

The lexical resource may thus allow identifying when two named entities refer to the same real world entity, e.g., Taiwan→Republic of China→ROC. The Coreference module allows pronouns, such as he, she, him, her, it or they to be linked to a named entity which is referred to in the same or a closely adjacent sentence and tagged with that named entity.

Referent matching is further discussed by Hickl, et al. Named entity recognition systems are disclosed, for example, in U.S. Pub. No. 2009/0204596, published Aug. 13, 2009, entitled SEMANTIC COMPATIBILITY CHECKING FOR AUTOMATIC CORRECTION AND DISCOVERY OF NAMED ENTITIES, by Caroline Brun, et al., U.S. Pub. No. 2008/0319978, published Dec. 25, 2008, entitled HYBRID SYSTEM FOR NAMED ENTITY RESOLUTION, by Caroline Brun, et al.

The output of referent matching is pairs of expressions in the Abstract and main body which are identified as including a respective referent which refers to the same named entity.

5. Semantic Matching

Semantic matching involves operations such as recognizing negation in a sentence (see, for example, Cabrio E., Kouylekov M., and Magnini B., 2008. Combining specialized entailment engines for RTE-4. In Proceedings of TAC-2008). Semantic Matching handles negation by focusing on direct licensors of negation such as overt negative markers (not, n't), negative quantifiers (no, nothing). It also handles negation by taking into consideration contradictions arising from the use of antonyms.

Scoring

Various methods of scoring the cohesiveness of the Abstract as a whole and/or the entailment of the matching sentences T,C can be employed. In one embodiment, the cohesiveness of the Abstract as a whole is scored based on the number and/or proportion of abstract sentences T which do (or do not) entail any main body sentences C. The scoring can also take into account entailment scores for each of the sentences which can be based on the similarity scores for the matching expressions. Any expressions in the abstract sentence which do not match an expression in the main body sentence may be treated as a lack of entailment. Or, where there are at least some matching expressions, an entailment may be recognized, but accorded a weaker score. The abstract evaluator 46 may output more than one scoring metric, such as a first score reflecting the sentences not entailed and a second score based on more detailed analysis of the entailed expressions which takes into account whether the similarity is weak or strong. For some applications, a simple measure of the cohesiveness of the abstract may be sufficient A binary output (yes if all sentences of the abstract entail a sentence of the main body, no if one or more sentences of the abstract do not) may be provided to the user in such cases. Any of these scoring methods can be used to provide an evaluation of the cohesiveness of the abstract to a user, e.g., by displaying a cohesiveness report 60 on the display 36 and/or by outputting a report to another output device, such as a printer (not shown) which prints the report on print media. The report 60 may indicate whether the abstract is/is not cohesive and provide an overall score, based on whether any sentences do not entail a main body sentence and the computed similarity scores of the matching expressions. Sentences receiving a low entailment score may also be identified to the user in the report 60.

EXAMPLE

As an example as to how the exemplary system 10 and method may use textual entailment, potentially matching expressions in the paper presented above are illustrated in FIG. 4. For each sentence pair (numbered 1 to 9), the expressions that should match between the abstract sentence and the corresponding sentence in the article body are numbered (where the expression is split, the parts are labeled A and B). Note that in some cases, the system may identify more than one main body sentence, as in the case of sentence pairs 1 and 2.

Some examples of simple cases of matching can be seen, as in the first sentence pair where the expressions in the abstract "relationship between" and "music" are repeated in the article body. Some matching cases are more complex.

Examples of lexical matching include:

A. From pair 1: Human body movement/body movement

B From pair 9: Van Noorden, L., & Moelants, 0.1999/Van Noorden & Moelants, 1999

C. From pair 2: human body movement/moving

D. From pair 3: were asked/were instructed

In cases A and B, a simple minimum edit distance threshold can be applied to determine that the two expressions match.

In case D, a lexical resource such as WordNet™ can be used to infer that the verb "ask" can have the same meaning as "instruct". The lexical resource may also allow determining that the pair in C are a match.

Examples of syntactic matching include

E. From pair 1: relationship between human body movement and music/relationship between music and body movement F. From pair 3: the tempo of musical/the perceived musical pulse In case E, syntactic analysis is employed to reveal that body movement and music are coordinated and the ordering of these two concepts (music before or after in the sentence) is not relevant.

Case F involves both lexical matching—to reveal synonymy between tempo and pulse—and syntactic matching to recognize that the X of Y can also be expressed as the Y X. In this case, the lexical and syntactic matching are independent.

Examples of lexico-syntactic matching are as follows:

G. From pair 6: varied between 50 and 190 beats per minute/ranged from 50 BPM to 190 BPM H. From pair 7: walk faster on music than on metronome stimuli/the walking speed on the metronome stimuli was significantly lower than on the musical stimuli I. From pair 9: is related to/play a role in These three cases represent a complex lexico-syntactic matching. The system identifies that vary between X and Y has the same meaning as range from X to Y. In H, patterns that have the same meaning are faster on X than on Y and lower on Y than on X. These are patterns that can be handled by the previously mentioned DIRT algorithm.

Some matches may be solved through a combination of matching technique.

J. From pair 2: relationship between/the synchronization and the spatialization aspect of . . . on . . .

K. From pair 2: in particular on/we focused on

L. From pair 9: perceptual resonance phenomenon/music perception

Case J may, with the appropriate matching rules, be decomposed into a lexico-syntactic matching such as relation between X and Y has the same meaning as synchronization aspect of X on Y. The DIRT algorithm, however, may not be able to provide such a complex match. Case K involves only one argument X: in particular on X/we focused on X. A match between this pair may be hard to recognize, even for a human, because the abstract sentence, which contains the in particular on expression, also contains the verb focus (The present study focuses on the intricate . . . ). This case, and case L may not be solved by the exemplary textual entailment component.

In some cases, the fact that the automated textual entailment component misses such complex matching may not negate identifying entailment between the two sentences where there is other evidence of entailment (e.g., other matching expressions). In the example sentences, for example, missing the match between in particular on and we focused on does not reflect missing of concept matching but a missing of argumental syntagm matching, which is less problematic for understanding the article. The two other missed matches J and L are at a more conceptual level. However, since they are easily missed by humans as well, they indicate that the coherence between the abstract and the article body is weaker than in the cases of semantic entailment, which are detected by the textual entailment component. Thus, if in such cases the system does not yield an entailment, the system is functioning appropriately.

As discussed above, the techniques for textual entailment applied by the textual entailment component 42 can be used to link research abstract sentences to text in the article body. The techniques discussed are available using known textual entailment systems that can be adapted to detect and thus link sentences in the article body that are entailed by sentences in the abstract. As will be appreciated, the method is not limited to existing techniques. For certain domain specific applications, for example, a set of rules can be developed which allow domain specific matching to be more effective.

The exemplary system 10 can be used for checking the coherence of the abstract with respect to the article, which is of particular value for the effectiveness of information retrieval. It can also be used for article internal navigation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document processing method comprising:
   receiving an input document which includes an abstract and a main body within the input document;
   storing the input document in memory of a computer system;
   identifying the abstract and the main body of the input document;
   for each sentence of the abstract of the input document, comparing the sentence with sentences of the main body of the input document using textual entailment techniques to identify whether the sentence of the abstract entails a sentence in the main body of the input document, the textual entailment techniques including identifying one-directional paraphrasing, wherein the entailed sentence in the main body need not entail the sentence of the abstract;
   generating links between the entailing sentences of the abstract and the corresponding entailed sentences of the input document; and
   outputting the generated links;
   wherein at least one of the comparing and link generation is performed with a computer processor.

2. The method of claim 1, further comprising automatically evaluating the coherence of the abstract based on whether fewer than all of the sentences of the abstract are identified as entailing a sentence of the main body.

3. The method of claim 1, further comprising outputting a report on the cohesiveness of the abstract based on whether fewer than all of the sentences of the abstract are identified as entailing a sentence of the main body.

4. The method of claim 1, further comprising scoring the abstract based on whether all of the sentences of the abstract entail a main body sentence.

5. The method of claim 1, wherein the scoring is also based on at least one similarity measure between the entailing sentence and the entailed sentence for each abstract sentence entailing a sentence of the main body.

6. The method of claim 1, wherein the outputting of the input document includes outputting the input document to a display.

7. The method of claim 6, wherein when a user actuates a link in the displayed abstract, a portion of the text of the main body comprising the corresponding linked sentence is displayed.

8. The method of claim 1, further comprising outputting a modified document which includes the links and providing for navigating the output modified document via the links.

9. The method of claim 8, wherein the outputting of the modified document includes outputting the modified document to a searchable database and wherein the navigation is provided when the modified document is retrieved from the database in response to a query.

10. The method of claim 1, wherein the links are cross-reference hyperlinks that each include link one of the entailing sentences of the abstract and an entailed sentence of the main body.

11. The method of claim 1, wherein the input document is a markup language document and the links are embedded in the markup language document in markup language.

12. The method of claim 1, wherein the links are stored in a database separately from the input document.

13. The method of claim 1, wherein at least some of the entailment techniques are selected from the group consisting of lexical matching, syntactic matching, lexico-syntactic matching, and semantic matching.

14. The method of claim 1 further comprising natural language processing of the abstract and main body of the input document prior to comparing the abstract sentences with sentences of a main body of the input document.

15. The method of claim 1, wherein the entailment techniques identify expressions in an abstract sentence which match corresponding expressions in a main body sentence, each matching pair of expressions meeting a threshold value of at least one similarity measure.

16. The method of claim 1, wherein the input document is a research article.

17. A non-transitory computer program product comprising a recording medium encoding instructions, which when executed on a computer causes the computer to perform the method of claim 1.

18. A computer system for linking abstract sentences to sentences in a main body of an input document comprising:
  memory which stores instructions for performing the method of claim 1 and a processor in communication with the memory for executing the instructions.

19. A computer system comprising:
  memory for storing an input document which includes an abstract and a main body;
  an entailment component implemented in hardware and software which, for each sentence of the abstract of the input document, compares the sentence with sentences of the main body of the input document using textual entailment techniques to identify whether the sentence of the abstract entails a sentence in the main body of the input document, the textual entailment techniques including identifying one-directional paraphrasing, wherein the entailed sentence in the main body need not entail the sentence of the abstract;
  at least one of:
    a) a link generator implemented in hardware and software which generates links between the entailing sentences of the abstract and the corresponding entailed sentences of the input document, and
    b) an evaluation component which evaluates the cohesiveness of the abstract based on whether fewer than all the sentences of the abstract are identified as entailing at least one sentence of the main body of the input document; and
  an output for outputting at least one of the generated links and the cohesiveness evaluation.

20. The computer system of claim 19, further comprising a parser which parses the input document using natural language processing, the entailment component operating on the parsed input document.

21. The method of claim 1, wherein the input document is a journal article.

22. The system of claim 19, wherein the system includes both of the link generator and the evaluation component and wherein the output outputs the generated links and the cohesiveness evaluation.

23. The method of claim 1, wherein the textual entailment identifies paraphrases of the format (X Z Y)→(X Z' Y), where Z and Z' are each a respective predicate which connects arguments X and Y, which have been determined to have the same or similar meaning in the abstract expression and main body expression, respectively.

* * * * *